US008559951B2

(12) United States Patent
Chen (10) Patent No.: US 8,559,951 B2
(45) Date of Patent: Oct. 15, 2013

(54) METHOD AND APPARATUS FOR PERFORMING HANDOVER IN A BLUETOOTH RADIOCOMMUNICATION SYSTEM

(75) Inventor: Hongyuan Chen, Tokyo (JP)

(73) Assignee: Intellectual Ventures I LLC, Wilmington, DE (US)

( * ) Notice: Subject to any disclaimer, the term of this patent is extended or adjusted under 35 U.S.C. 154(b) by 1324 days.

(21) Appl. No.: 10/507,792

(22) PCT Filed: Mar. 13, 2002

(86) PCT No.: PCT/IB02/02008
§ 371 (c)(1),
(2), (4) Date: Feb. 22, 2005

(87) PCT Pub. No.: WO03/077583
PCT Pub. Date: Sep. 18, 2003

(65) Prior Publication Data
US 2005/0130656 A1     Jun. 16, 2005

(51) Int. Cl.
  H04W 36/00    (2009.01)
  H04W 4/00     (2009.01)
  H04B 7/00     (2006.01)
(52) U.S. Cl.
  USPC .......... 455/436; 455/437; 455/438; 455/439; 455/41.2; 370/331; 370/350
(58) Field of Classification Search
  USPC ............. 455/11.1, 41.2, 560, 561, 41.1, 41.3, 455/436–444, 502, 507, 517; 370/346, 449, 370/331, 350
  See application file for complete search history.

(56) References Cited

U.S. PATENT DOCUMENTS

| | | | | | |
|---|---|---|---|---|---|
| 5,081,679 | A | * | 1/1992 | Dent | 380/272 |
| 5,231,632 | A | * | 7/1993 | Yamao et al. | 370/331 |
| 5,375,123 | A | * | 12/1994 | Andersson et al. | 370/333 |
| 5,432,843 | A | * | 7/1995 | Bonta | 455/438 |
| 5,444,766 | A | * | 8/1995 | Farwell et al. | 455/437 |
| 5,509,035 | A | * | 4/1996 | Teidemann et al. | 375/356 |
| 5,648,955 | A | * | 7/1997 | Jensen et al. | 370/252 |
| 5,708,963 | A | * | 1/1998 | Mobley et al. | 455/12.1 |
| 5,784,695 | A | * | 7/1998 | Upton et al. | 455/442 |
| 6,148,209 | A | * | 11/2000 | Hamalainen et al. | 455/450 |
| 6,212,173 | B1 | * | 4/2001 | Lindsay et al. | 370/331 |
| 6,272,345 | B1 | * | 8/2001 | Worger et al. | 455/436 |

(Continued)

FOREIGN PATENT DOCUMENTS

| | | |
|---|---|---|
| WO | WO-01/20940 A1 | 3/2001 |
| WO | WO-01/78246 A1 | 10/2001 |
| WO | WO-02/03626 A2 | 1/2002 |

*Primary Examiner* — Wesley Kim (57) ABSTRACT

Apparatus and method for handing over, at a time instance, a first low power radio frequency transceiver participating in a first network of low power radio frequency transceivers using first network parameter(s) and controlled by a first master transceiver from the first network to a second network of low power radio frequency transceivers using second network parameter(s) and controlled by a second master transceiver. An indication of the time instance is sent to the first low power radio frequency transceiver. An indication of the time instance is also sent to the second master transceiver. An indication of the second network parameter(s) is sent to the first low power radio frequency transceiver. The first transceiver switches from using the first network parameter(s) to using the second network parameter(s) at time the time instance. The second master transceiver polls the first transceiver at the time instance using the second network parameters.

50 Claims, 5 Drawing Sheets

(56) References Cited

U.S. PATENT DOCUMENTS

| | | | |
|---|---|---|---|
| 6,324,406 B1* | 11/2001 | Zadeh | 455/456.2 |
| 6,430,395 B2* | 8/2002 | Arazi et al. | 455/41.2 |
| 6,519,460 B1* | 2/2003 | Haartsen | 455/452.1 |
| 6,834,192 B1* | 12/2004 | Watanabe et al. | 455/444 |
| 2001/0006515 A1* | 7/2001 | Lee et al. | 370/331 |
| 2002/0126013 A1* | 9/2002 | Bridgelall | 340/572.1 |
| 2002/0141360 A1* | 10/2002 | Baba et al. | 370/331 |
| 2003/0003915 A1* | 1/2003 | Foster et al. | 455/442 |
| 2003/0040328 A1* | 2/2003 | Indirabhai | 455/502 |
| 2003/0058921 A1* | 3/2003 | Leeper | 375/132 |
| 2003/0060222 A1* | 3/2003 | Rune | 455/517 |

* cited by examiner

NNL of M1

| Bluetooth Address | Clock Time | Network Address | Master? |
|---|---|---|---|
| B_ADDR (M) | Clk (M2) | AM_ADDR (M1) | Y |
| B_ADDR (M3) | Clk (M3) | AM_ADDR (M2) | Y |
| ⋮ | ⋮ | ⋮ | ⋮ |
| B_ADDR (S) | Clk (S) | AM_ADDR (S) | N |
| B_A | | AM_ADDR (S) | |

Table 1

METHOD AND APPARATUS FOR PERFORMING HANDOVER IN A BLUETOOTH RADIOCOMMUNICATION SYSTEM

FIELD OF THE INVENTION

The present invention relates to handover of a transceiver from a first network of communicating low power radio frequency transceivers to a second network of communicating low power radio frequency transceivers. It has particular application to handover of a slave transceiver from a first Bluetooth piconet to a second Bluetooth piconet.

BACKGROUND OF THE INVENTION

Figure 1:
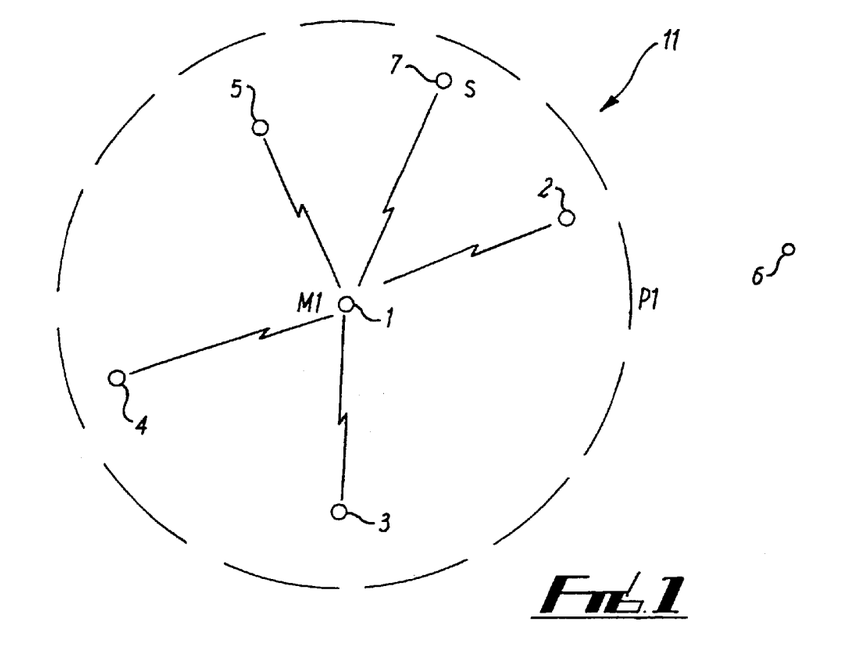
FIG. 1 schematically illustrates a piconet P1 controlled by transceiver M1.

FIG. 1 illustrates a network (Bluetooth piconet P1) 11 of radio transceiver units 1, 2, 3, 4, 5 and 7. The network is a radio frequency network suitable for transmitting voice information or data information between transceivers. The transmissions made are of low power, for example 0 to 20 dBm, and the transceiver units can effectively communicate over the range of a few tens or hundred of meters. The transceivers transmit and receive, in this example, in a microwave frequency band, illustratively 2.4 GHz. Interference in the piconet is reduced by changing the frequency at which each successive radio packet in the piconet is transmitted. A number of separate frequency channels are assigned each with a bandwidth of 1 MHz, and the frequency may hop at a rate of 1600 hops/s.

The transceiver 1 is the master M1 of the piconet P1 and the transceivers 2, 3, 4, 5 and 7 are slaves in the piconet P1. The transceiver 6 lies outside the range of transceiver 1 and is outside the piconet P1. There is only one master in a piconet. The master can directly communicate with each slave in its piconet but each slave can only directly communicate with the master. The piconet operates in a time division duplex fashion.

Figure 2:
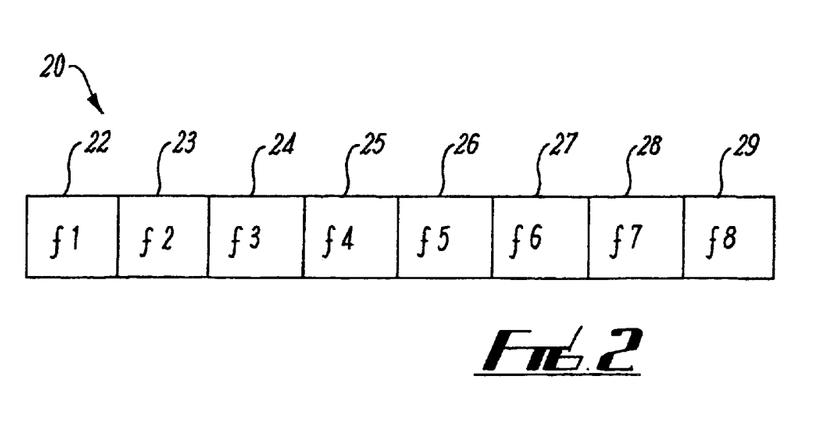
FIG. 2 illustrates the timing of packets transmitted in the network.

FIG. 2 illustrates a time frame 20 used by the master unit M1. The frame illustratively has slots 22 to 29 of equal length (625 microseconds). Each slot carries a packet of data and is allocated a different one of a sequence of hopping frequencies.

Figure 3:
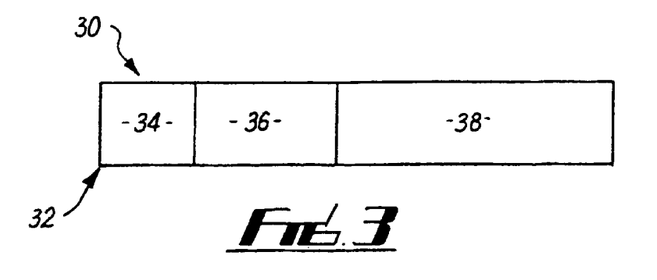
FIG. 3 illustrates a packet transmitted in the network.

FIG. 3 illustrates a typical radio packet 30. The radio packet has a start 32 and contains three distinct portions: a first preamble portion contains an Access Code 34, a second portion contains a Header 36 and a third portion contains a Payload 38. The Access Code is a series of bits used in the network to identify the start of a radio packet. The Channel Access Code identifies a piconet and is included in all packets communicated in the piconet channel. The header 36 of a packet transmitted from the master to a slave contains the active member address (AM_ADDR) of the addressed slave which identifies the slave within the piconet. The payload 38 carries either transceiver control information or voice/data information.

In the Connection State, when the master and slaves are communicating, the packets sent in the piconet use the same channel access code (derived from Bluetooth device address BD_ADDR of the master unit) and the same frequency hopping sequence, the channel hopping sequence (derived from Bluetooth device address BD_ADDR of the master unit). The transceiver units are synchronised to a common time frame determined by the master unit and described in relation to FIG. 2. The frequency at which each radio packet is transmitted is determined by the phase of the channel hopping sequence. The phase varies with the master clock and the transmission frequency changes (hops) every 625 microseconds.

Figure 4:
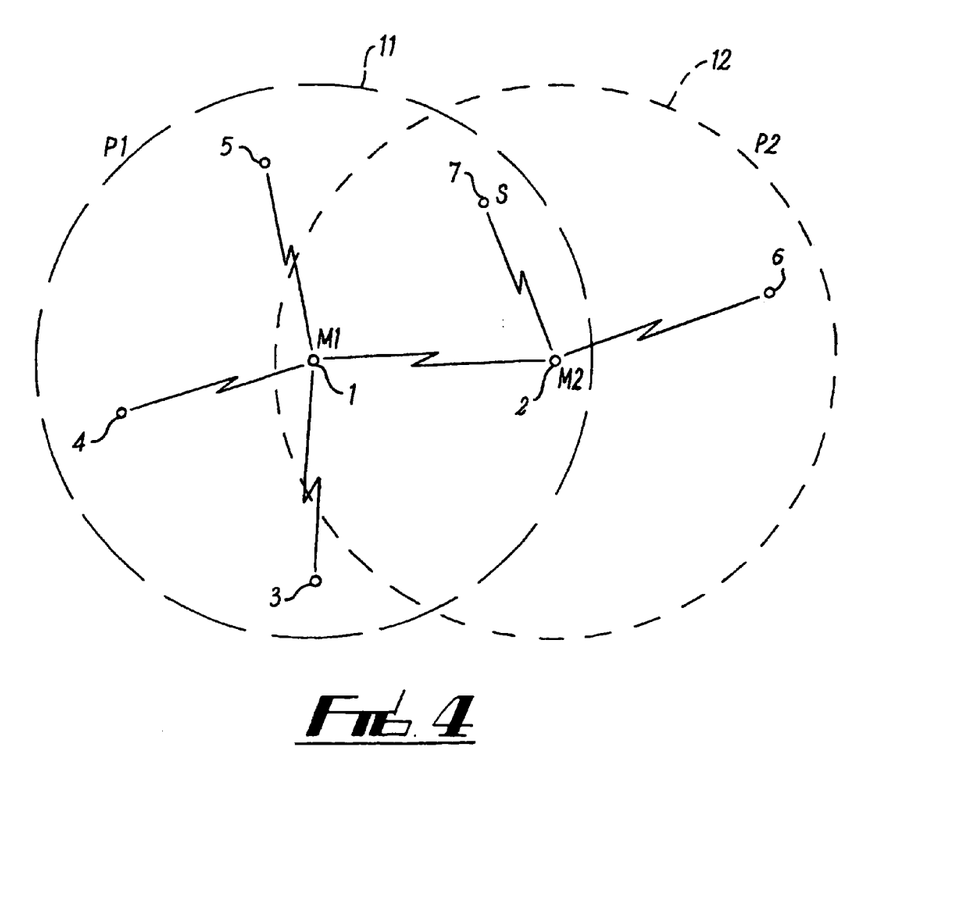
FIG. 4 illustrates a piconet P1 and a piconet P2 after transceiver S has been handed over from P1 to P2.

It would be desirable to be able to handover the slave transceiver 7 from the piconet P1 to another piconet P2 controlled by master M2 having overlapping radio coverage area with P1. FIG. 4 illustrates the scatternet formed after a handover to master M2. The piconet P2, referenced by numeral 12, comprises transceivers 1, 2, 6 and 7 with transceiver 2 the master M2.

SUMMARY OF THE INVENTION

According to one aspect of the present invention there is provided a low power radio frequency transceiver (M1) for controlling a first network (P1) of low power radio frequency transceivers, using first network parameter(s) and including a first transceiver (S), and for handing-over, at a time instance (T2), the first transceiver (S) from the first network (P1) of low power radio frequency transceivers to a second network (P2) of low power radio frequency transceivers, using second network parameter(s) and controlled by a second low power radio frequency transceiver (M2), comprising: transmission means (50); and control means (46) arranged to control the transmission means (50) to send the second network parameter(s) to the first transceiver (S) and an indication of the time instance (T2) to both the first transceiver (S) and second transceiver (M2). The transmission means includes low power radio frequency transmission means. According to one embodiment, the transmission means may additionally use a physical (as opposed to radio) connection to transmit to the second transceiver (M2).

The first network parameter(s) may be any one or more of: an indication of a frequency hopping sequence used in the first network; an identifier of the first network; and a time base of the first network. The second network parameter(s) may be any one or more of: an indication of the frequency hopping sequence used in the second network; an identifier of the second network; and a time base of the second network.

The second low power radio frequency transceiver (M2) may have a fixed identifying address (BD_ADDR) and the second network parameter(s) may comprise at least a portion of the fixed identifying address (BD_ADDR). The second low power radio frequency transceiver (M2) may have a free-running clock (52) and the second network parameter(s) may comprise means for the emulation of the second transceiver's clock in the first transceiver (S).

The second low power radio frequency transceiver (M2) may assign temporary addresses (AM_ADDR) to the low power radio frequency transceivers of the second network (P2) and direct a communication to a particular transceiver by using a particular temporary address (AM_ADDR). The low power radio frequency transceiver (M1) may be arranged to send an indication of the temporary address (AM_ADDR) to be used by the second transceiver (M2) in communicating with the first transceiver (S), to the first transceiver (S).

The low power radio frequency transceiver (M1) may control the handover in dependence on communication quality measurements and it may have reception means (44) for receiving communication quality measurements (60a, 60b).

The control means (46) may be arranged to control the handover of the first transceiver (S) to any one of a plurality of candidate networks (Pn) controlled by candidate transceivers (Mn), by controlling the transmission means (50) to send, to the first transceiver (S), the network parameter(s) for each of the candidate networks (Pn) and an indication of the time instance (Tn) of handover to each of the candidate networks (Pn) and to send, to each candidate transceivers (Mn), an indication of the time instance (Tn) of handover to that candidate transceiver.

According to another aspect of the present invention there is provided a low power radio frequency transceiver (S) for participating in a first network (P1) of low power radio frequency transceivers, controlled by a first transceiver (M1), by communicating, using first network parameter(s), with the first transceiver (M1) and for switching, at a time instance (T2), to communicating, using second network parameter(s), with a second low power radio frequency transceiver (M2) controlling a second network (P2) of low power radio frequency transceivers comprising: low power radio frequency reception means (44) arranged to receive from the first transceiver (M1) the second network parameter(s) and an indication of the time instance (T2); and control means (46) arranged to control the reception means (44) at the time instance (t2) to switch from receiving in the first network (P1) using the first network parameter(s), to receiving in the second network (P2) using the second parameter(s).

According to a further aspect of the present invention there is provided a low power radio frequency transceiver (M2) for participating in a first network (P1) of low power radio frequency transceivers, including a second low power radio frequency transceiver (S), using first network parameters and controlled by a first low power radio frequency transceiver (M1) and for controlling a second network (P2) of low power radio frequency transceivers, using second network parameter(s), comprising: reception means (44) for receiving from the first transceiver (M1) an indication of a time instance (T2); transmission means (50); and control means (46) for controlling the transmission means (50), at the received time instance (T2), to poll the second transceiver (S) using the second network parameters and for controlling the reception means (44) to receive, using the second network parameter, a reply to the poll. The reception means includes low power radio frequency reception means. According to one embodiment, the reception means may additionally use a physical (as opposed to radio) connection to receive from the first transceiver (M1).

The control means (46) may control the transmission means (50) to send a packet having a header comprising an address (AM_ADDR) of the second transceiver (S). The address of the transceiver may be either a default address used for handover or is received from the first transceiver (M1).

The control means (46) may be arranged to control the transmission means (50) to send an acknowledgement to the first transceiver (M1) using the first network parameters in response to a reply received from the second transceiver (S).

The low power radio transceiver (M2) may have means for detecting the quality of the communication channel between it and the second transceiver (S) and for sending an indication of the quality of communication to the first transceiver (M1).

According to a still further aspect of the present invention there is provided a method of handing over, at a time instance (T2), a first low power radio frequency transceiver (S) participating in a first network (P1) of low power radio frequency transceivers using first network parameter(s) and controlled by a first master transceiver (M1) from the first network (P1) to a second network (P2) of low power radio frequency transceivers using second network parameter(s) and controlled by a second master transceiver (M2) comprising the steps of: sending an indication of the time instance (T2) to the first low power radio frequency transceiver (S); sending an indication of the time instance (T2) to the second master transceiver (M2); sending an indication of the second network parameter(s) to the first low power radio frequency transceiver (S); and switching the first transceiver (S) from using the first network parameter(s) to using the second network parameter(s).

The poll may be sent in the second network (P2). There may be a further step of sending a reply to the poll from the first transceiver (S) to the second master (M2) in the second network (P2). There may also be the step of sending an acknowledgement from the second master (M2) to the first master (M1).

BRIEF DESCRIPTION OF THE DRAWINGS

For a better understanding of the present invention reference will now be made, by way of example only, to the accompanying drawings in which.

Table 1 illustrates the contents of a network neighbour list (NNL).

DETAILED DESCRIPTION OF THE INVENTION

Figure 5:
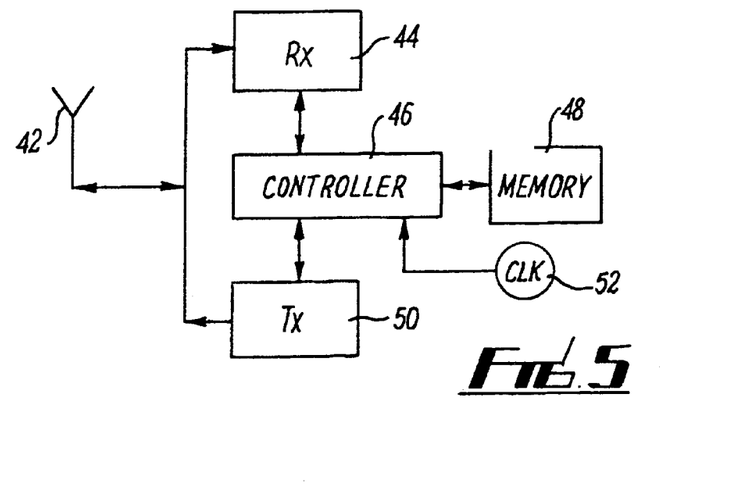
FIG. 5 is a schematic illustration of a transceiver.

FIG. 5 illustrates a transceiver 40 which operates as any one of the transceivers 1, 2, 3, 4, 5, 6 or 7 illustrated in FIGS. 1 and 4. The transceiver 40 has an antenna 42, a receiving section 44, a transmitting section 50, a controller 46 and a memory 48. The controller 46 can write to and read from the memory 48 and is in bi-directional communication with both the receiver section 40 and the transmitter section 50. The native clock 52 is a Bluetooth clock which provides a time base to the controller 46.

The controller 46 controls receiver 44 so that it is receiving at the correct phase of the correct channel hop sequence. The Channel Hop Sequence (CHS) is determined by the Bluetooth Address (B_ADDR) of the master transceiver of the piconet the transceiver 40 is communicating in. The phase within the Channel Hop Sequence is determined by the timing of the piconet master transceiver. The correct phase in the Channel Hop Sequence is maintained by adding an offset to the value of the free-running native clock 52. For the master transceiver, the offset is zero and for a slave transceiver it is set periodically as the difference between a received value of the master's Bluetooth clock and the value of the transceiver's native clock.

The controller 46 controls the receiver 44 so that it uses the correct Channel Access Code (CAC) to detect an incoming packet of data belong to its piconet, and the correct AM_ADDR to detect from the header of the incoming packet whether the packet is addressed to it in particular.

The controller receives the payload of a packet addressed to the transceiver and processes it storing information in memory 48 as necessary.

The controller 46 controls transmitter section 50 so that it is transmitting at the correct phase of the Channel Hop Sequence. The Channel Hop Sequence is determined by the Bluetooth Address B_ADDR of the master transceiver of the piconet. The phase within the channel hop sequence is determined by the timing of the piconet's master transceiver.

The controller 46 controls the receiver 50 so that it uses the correct channel access code for the piconet in the preamble of an out-going packet of data, and, if acting as master, the correct AM_ADDR if the out-going packet header for a particular slave.

The receiver 44 additionally has circuitry for determining the quality with which a signal is received at antenna 42. The circuitry measures the signal strength of the received signal and the received signal strength indication (RSSI) is provided to the controller 46.

The master M1 in FIGS. 1 and 4 maintains a network neighbour list (NNL) which is stored in memory 48. The NNL for M1 is illustrated in Table 1. It has four columns headed 'Bluetooth Address', 'Clock time', 'network address' and 'master?'. There is a row for each participant in the piconet P1. The entry in the 'Bluetooth Address' column for a particular row gives the B_ADDR of the participant. The entry in the 'Clock Time' column for a particular row gives the Bluetooth clock value Clk for the participant. The entry in the 'network address' column for a particular row gives AM_ADDR for the participant. The entry in the 'master?' column for a particular row indicates whether the participant is also a master of its own network.

The controller 46 of the master M1, monitors RSSI of packets received from the slave S. When the value falls beneath a threshold value it makes a decision to hand over the slave S to another network. The handover decision may be based upon other criteria such as excessive load on master M1.

The master M1 sends to the slave S a candidate list of neighbouring masters. This list is derived from the NNL. Each of the entries in the NNL, which indicate that the entrant is a master, is a potential candidate. The master M1 also determines the time instances at which the attempt to handover to each candidate occurs.

The master M1 sends to S, for each candidate master Mn, the parameters of the piconet Pn the candidate controls i.e. the candidate's B_ADDR(Mn) and the candidate's Bluetooth clock value Clk(Mn). These values for a candidate will be contained in the payload of a packet which is sent in the piconet P1 i.e. it uses the CAC (M1) and CHS(M1) with phase determined by Clk(M1). The packet also has AM_ADDR(S) in the header. The Bluetooth clock value Clk(Mn) is preferably sent as a value based upon the slave S native clock 52. The master M1 sends Clk(Mn)-Clk(S). This is the offset which is added to the native clock of S to emulate Clk(Mn).

The master M1 may also send to S the AM_ADDR(Mn) which the master Mn will use to address slave S. However, it is possible to have a specially reserved AM_ADDR for handover, in which case it would not be necessary to communicate AM_ADDR(Mn) to S. A convenient vehicle for transmitting the AM_ADDR(Mn), B_ADDR(Mn) and Clk(Mn) is the FHS packet defined in Bluetooth Specification 1.0B November 1999.

The master M1 additionally sends to S, for each candidate master Mn, a time instance Tn at which the slave S should attempt to handover to the candidate master Mn. This value Tn is conveniently transmitted to the slave in the same payload as the piconet parameters for the candidate.

The value Tn is preferably sent as a value based upon the native clock 52 of slave S or as an absolute value (if supported).

The slave receives the packets sent by the master M1 and stores the payload contents in memory 48. The slave determines for each candidate master Mn an offset to be added to its native clock to emulate the clock of the master Clk(Mn). The slave also determines for each candidate master Mn the associated channel access code CAC(Mn) from the received B_ADDR(Mn).

At time Tn, the slave S prepares to be polled by master Mn in piconet Pn. The controller 46 instructs the receiver 44 to use CAC(Mn) and to use the CHS(Mn). The correct phase of the CHS(Mn) is determined by from the emulated Clk(Mn). The controller 46 also instructs the receiver 44 to use the correct AM_ADDR whether that is a default value assigned for handover or a value AM_ADDR(Mn) previously sent by M1.

The master M1 additionally, in piconet P1, sends to each candidate master Mn a packet having a payload indicating the time instance Tn at which it should attempt to take control of the slave S. Each packet uses the channel access code (M1) and the AM_ADDR of the destination transceiver in P1 in the header. The payload of the packet may additionally contain the B_ADDR(S) and Clk(S).

Each value Tn is preferably sent as a value based upon the native clock Mn of the destination transceiver or as an absolute value (if supported).

Each master Mn will attempt to poll the slave S at its allocated time Tn in its piconet. The poll sent by master Mn to slave S is any packet, but preferably a NULL packet, having CAC(Mn). It is sent at a frequency determined by the CHS (Mn) at the phase determined by the current value of the native clock 52. The header contains AM_ADDR which is either AM_ADDR(Mn) or the default value of AM_ADDR assigned for handover. The poll is repeated until it has occurred a maximum number of times or a poll reply message is received, whichever is earlier.

At time Tn, the slave S switches to handover mode and listens for a poll from master Mn in the following slot. If it does not receive a poll from Mn it listens for a poll from master Mn+1 at the slot following time Tn+1. If it successfully receives a poll from Mn, slave S sends a reply in piconet Pn to the master Mn using a packet with Channel Access Code (Mn), and with a frequency determined from the CHS(Mn) and Clk(Mn) and does not listen for additional polls from the remaining candidate masters. The last candidate of the candidate list received by the slave from M1 is M1 itself, it provides a opportunity for slave to come back to M1 if it has not successfully received a poll from all candidates.

When the master Mn receives a poll reply from the slave S, it sends an acknowledgement to the master M1 indicating completion of the handover process. The acknowledgement is sent in piconet P1, that is with CAC(M1) and using CHS(M1) with phase determined by Clk(M1).

Figure 6:
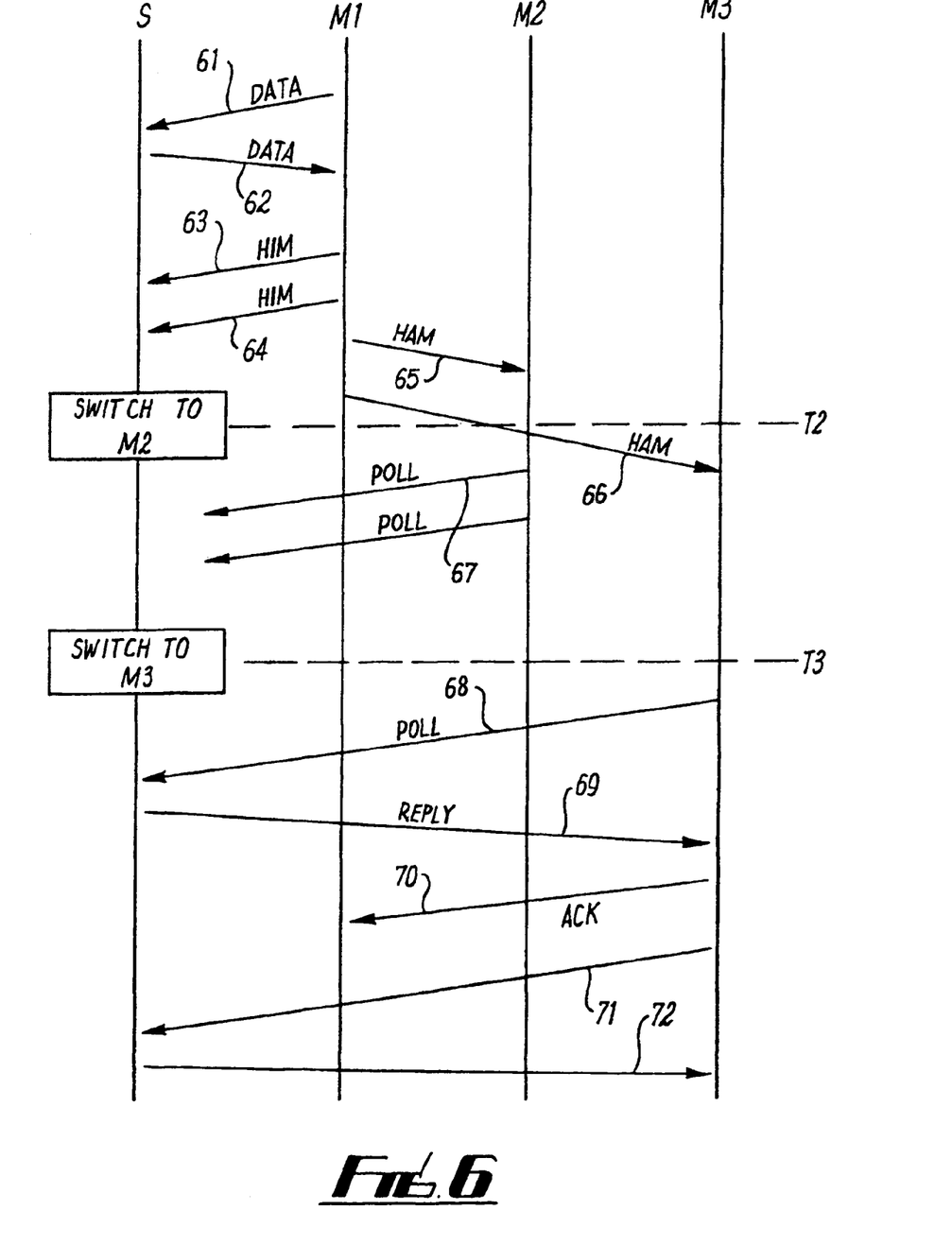
FIG. 6 illustrates the signalling between M1, M2, M3 and S before, during and after handover; according to a first embodiment.

FIG. 6 shows an example message chart, in which the slave S is handed off to from M1 to M3, the second candidate. The master M1 and slave S in piconet P1 communicate by sending data from the master M1 to the slave (61) and from the slave to the master (62). The master M1 sends in piconet P1 a handover initiation messages to the slave S. A first handover initiation message 63 comprises B_ADDR(M2), Clk(M2) & T2 which are the parameters for piconet P2 controlled by M2 and the handover time to M2. A second handover initiation message 64 comprises B_ADDR(M3), Clk(M3) & T3 which are the parameters for piconet P3 controlled by M3 and the handover time to M3. One handover initiation message may also contain parameters of several piconets. A first handover activation message 65 is sent from M1 to M2 before time T2. The message comprises at least the time T2. A second handover activation message 66 is sent from M1 to M3 before time T3. The message comprises at least the time T3. At time T2 the slave S switches from listening in piconet P1 to listening in piconet P2. After time T2, M2 sends in piconet P2 a POLL signal 67 to slave S. In this instance the slave S does not receive the poll and issues no reply. At time T3, the slave S switches to listen in piconet P3. After time T3, M3 sends in piconet P3 a Poll signal 68 to slave S. The slave S receives the poll 68 and issues a reply 69 in piconet P3 to M3. The master M3 issues an acknowledgement to M1. This completes the handover. The master M3 and slave S now in piconet P3 communicate by sending data from the master M3 to the slave (71) and from the slave to the master (72).

In the foregoing description, the decision to handover may be made on the basis of the RSSI measurements of the packets received from S by master M1. Of course other quality indicators other than RSSI could be used as parameters in the decision.

As an alternative to the above described embodiment in which a list of candidate master transceivers is used, the following embodiment instructs the slave S to handover to one master M which the master M1 has selected M from a candidate list. The candidate transceivers are adapted to detect the slave S and to measure packets transmitted from S. The candidates measure the quality of the received signal transmitted by S and each transmits its quality indication to M1. M1 having received a quality indication from each of the candidates can determine if any improvement in transmission quality is to be gained by handing the slave S over to one of the candidates and if so which one is optimal. Once an optimal candidate has been selected the procedure is described as above, the candidate list comprising only one entry. This alternative embodiment is illustrated in FIG. 7.

Figure 7:
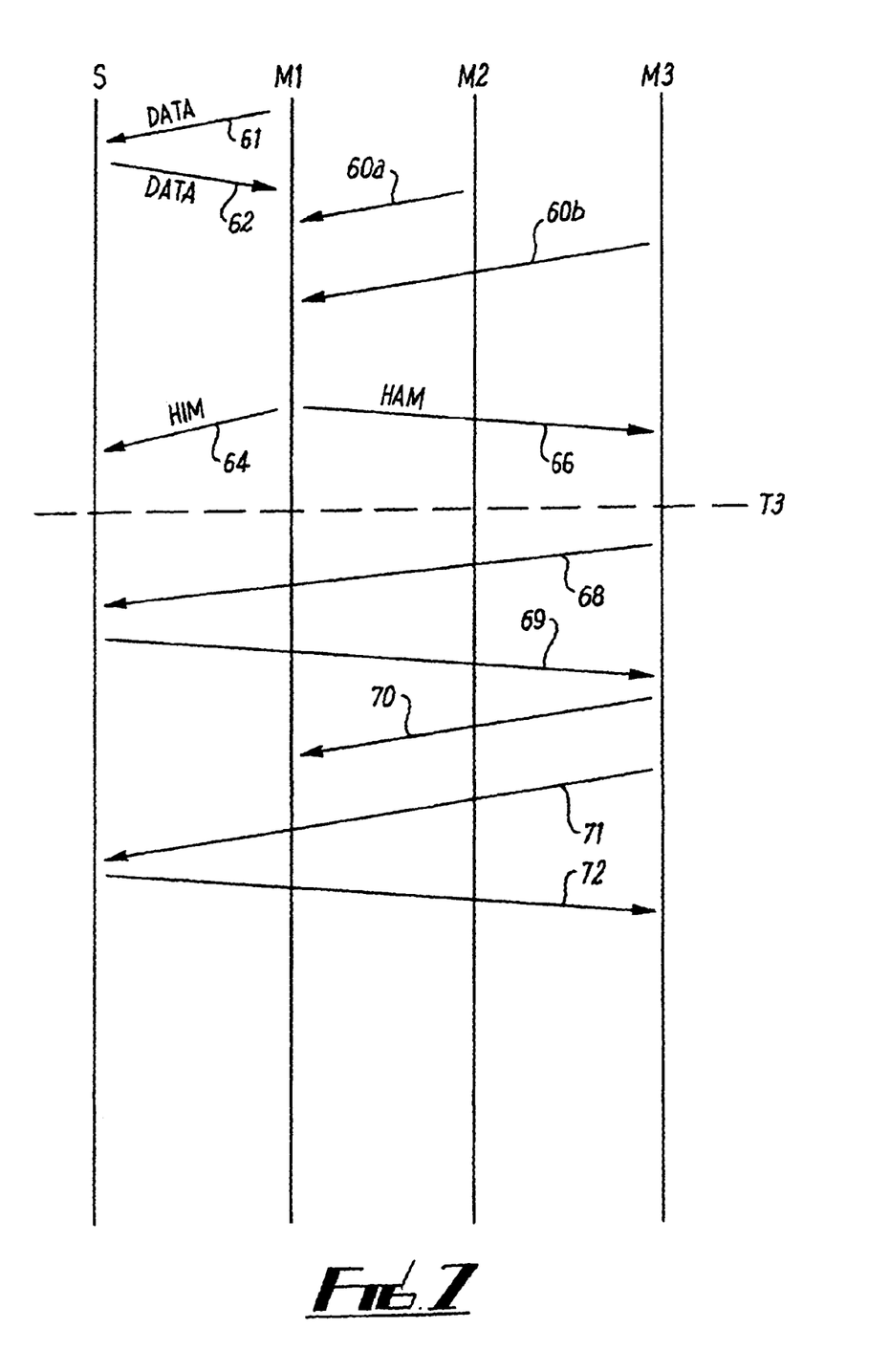
FIG. 7 illustrates the signalling between M1, M2, M3 and S before, during and after handover, according to a second embodiment.

FIG. 7 shows an example message chart, in which the slave S is handed off from M1 to M3, the only candidate. The master M1 and slave S in piconet P1 communicate by sending data from the master M1 to the slave (61) and from the slave to the master (62). The master M2 sends a message 60*a* to M1 indicating that M2 has detected the presence of S and preferably giving some indication of the likely quality of communication between M2 and S. The master M3 sends a message 60*b* to M1 indicating that M3 has detected the presence of S and preferably giving some indication of the likely quality of communication between M3 and S. The master M1 determines that S should be handed over to M3 and sends one handover initiation messages 64 comprising B_ADDR(M3), Clk(M3) & T3 to S. A handover activation message 66 is sent from M1 to M3 before time T3. The message comprises at least the time T3. At time T3, the slave S switches to listen in piconet P3 and the procedure is as described for FIG. 6.

In the foregoing description, the master transceivers communicate with one another using low power radio frequency communications. According to another embodiment, the master transceivers are physically connected by, for example, wires. All the communication between master transceivers, in this embodiment, is carried out using the physical connections. Thus the NNL in a master may be kept up to date by communicating with neighbouring master transceivers using the physical connections. In addition, the handover activation messages (65 and 66 in FIGS. 6 & 7), the handover acknowledgement (70 in FIG. 6) and any messages (60*a*, 60*b* in FIG. 7) indicating that a master has detected the presence of a slave are sent using the physical connections.

Whilst endeavouring in the foregoing specification to draw attention to those features of the invention believed to be of particular importance it should be understood that the Applicant claims protection in respect of any patentable feature or combination of features hereinbefore referred to and/or as shown in the drawings whether or nor particular emphasis has been placed thereon. In addition to the examples described above, functions and systems disclosed herein may be embodied in a non-transitory computer readable medium with instructions stored thereon that are executable to accomplish the various functions described.

The invention claimed is:

1. A first master transceiver for controlling a network of transceivers, and for participating in a handover of a slave transceiver from a first network of transceivers to a second network of transceivers, the first master transceiver comprising: a transmitter section; a receiver section; and a controller configured to control the transmitter section to send one or more network parameters of the second network to a slave transceiver and to send an indication of a first handover time instance to both the slave transceiver and to a second master transceiver in the second network, wherein the first handover time instance indicates a future time to hand over the slave transceiver from the first network to the second network controlled by the second master transceiver; and wherein the receiver section is configured to receive a second handover time instance from the second master transceiver in response to initiation of a handover of the slave transceiver from the second network to the first network, wherein the second handover time instance indicates a future time for handover of the slave transceiver to the first network, wherein the controller is further configured to control the transmitter section to send a polling message to the slave transceiver substantially at the second handover time instance, and wherein the polling message comprises a poll configured to cause a specific poll reply message to the poll; wherein first handover time instance indicates the future time as a time offset with respect to an internal clock of the slave transceiver.

2. The first master transceiver as claimed in claim 1, wherein the first network comprises a network parameter different from the network parameters of the second network, and wherein the network parameter of the first network includes at least one of:

an indication of a frequency hopping sequence used in the first network;

an identifier of the first network; and a time base of the first network.

3. The first master transceiver as claimed in claim 1, wherein the network parameter of the second network includes at least one of:

an indication of a frequency hopping sequence used in the second network;

an identifier of the second network; and a time base of the second network.

4. The first master transceiver as claimed in claim 1, wherein the second master transceiver comprises a fixed identifying address and the network parameter of the second network comprises at least a portion of the fixed identifying address.

5. The first master transceiver as claimed in claim 1, wherein the controller is further configured to control the handover in dependence on communication quality measurements.

6. The first master transceiver as claimed in claim 5, wherein the receiver section is further configured to receive one or more communication quality measurements.

7. The first master transceiver as claimed in claim 1, wherein the controller is further configured to form a physical connection to the second master transceiver, wherein the transmitter section is configured to communicate via the physical connection and via low power radio frequency transmission means, and wherein the controller is configured to control the transmitter section to send the indication of the first handover time instance to the second master transceiver via the physical connection.

8. The first master transceiver as claimed in claim 1, wherein the network parameter of the first network is independent of and different from the network parameter of the second network.

9. The first master transceiver as claimed in claim 1, wherein the network parameter of the first network is sufficient for participation of the slave transceiver in the first network.

10. The first master transceiver as claimed in claim 1, wherein the network parameter of the second network is sufficient for participation of the slave transceiver in the second network.

11. The first master transceiver as claimed in claim 1, wherein the polling message contains a channel access code associated with the first network.

12. The first master transceiver as claimed in claim 1, wherein, if the first master transceiver is to have the slave transceiver handed over to the first network from the second network, the receiver section is further configured to receive a poll reply message from the slave transceiver.

13. The first master transceiver as claimed in claim 12, wherein the poll reply message includes a channel access code associated with the first network.

14. The first master transceiver as claimed in claim 1, wherein each of the networks is a low-power wireless communication network.

15. The first master transceiver as claimed in claim 1, wherein the controller is further configured to control the transmitter section to send the at least one polling message in at least one time slot assigned to the first master transceiver in the first network.

16. A slave transceiver for participating in a first network of transceivers and a second network of transceivers, the slave transceiver comprising:
    a receiver section configured to: receive, from a first master transceiver configured to control the first network of transceivers, an indication of a future time instance for handover to the second network of transceivers and one or more network parameters of the second network of transceivers; and
    receive a polling message, transmitted substantially at the future time instance, from a second master transceiver configured to control the second network of transceivers; and
    a transmitter section configured to transmit to the second master transceiver, using the network parameters of the second network of transceivers, a reply to a polling message received from the second master transceiver,
    wherein the polling message comprises a poll configured to cause a specific poll reply message to the poll; wherein the future time instance indicates the future time as a time offset with respect to an internal clock of the slave transceiver.

17. The slave transceiver as claimed in claim 16, wherein the slave transceiver has a free-running clock, and wherein the network parameter for the second network includes a parameter for the emulation of the second master transceiver's clock in the slave transceiver.

18. The slave transceiver as claimed in claim 16, wherein the polling message contains a channel access code associated with the second network.

19. The slave transceiver as claimed in claim 16, wherein the reply to the polling message includes a channel access code associated with the second network.

20. The slave master transceiver as claimed in claim 16, wherein each of the networks is a low-power wireless communication network.

21. The slave transceiver as claimed in claim 16, wherein the receiver section is further configured to receive the polling message in a time slot following the future time instance for handover.

22. A method of handing over a slave transceiver from a first network to a second network, the method comprising:
    sending, by a first master transceiver configured to control the first network, an indication of a future time instance for handoff to the slave transceiver;
    sending, by the first master transceiver, an indication of the time instance to a second master transceiver configured to control the second network, to enable the second master transceiver to send a poll substantially at the future time instance from the second master transceiver to the slave transceiver, wherein the poll comprises a poll configured to cause a specific poll reply message to the poll; and
    sending, by the first master transceiver, an indication of a network parameter of the second network to the slave transceiver to enable switching the slave transceiver from using a network parameter of the first network to using the network parameter of the second network; wherein the future time instance indicates the future time as a time offset with respect to an internal clock of the slave transceiver.

23. The method as claimed in claim 22, further comprising receiving an acknowledgment from the second master transceiver by the first master transceiver.

24. The method as claimed in claim 22, wherein the poll contains a channel access code associated with the second network.

25. The method as claimed in claim 22, wherein each of the networks is a low-power wireless communication network.

26. The method as claimed in claim 22, wherein the second master transceiver is enabled to send the poll during a time slot assigned to the second master transceiver in the second network.

27. A method of handing over a slave transceiver from a first network to a second network, the method comprising:
    receiving, at the slave transceiver, an indication of a time instance for future handover from a first master transceiver of the first network;
    receiving, at the slave transceiver, an indication of a network parameter of the second network used by the second network from the first master transceiver;
    receiving, at the slave transceiver, a polling message from the second master transceiver transmitted substantially at the time instance, wherein the polling message comprises a poll configured to cause a specific poll reply message to the poll; and switching the slave transceiver from using a network parameter of the first network to using the network parameter of the second network; wherein the time instance indicates the time as a time offset with respect to an internal clock of the slave transceiver.

28. The method as claimed in claim 27, wherein the polling message contains a channel access code associated with the second network.

29. The method as claimed in claim 27, further comprising transmitting a reply to the polling message, wherein the reply to the polling message includes a channel access code associated with the second network.

30. The method as claimed in claim 27, wherein each of the networks is a low-power wireless communication network.

31. The method as claimed in claim 27, wherein the receiving, at the slave transceiver, a polling message from the second master transceiver transmitted substantially at the time instance comprises receiving the polling message from the second master transceiver in a time slot following a time slot allocated to the second master transceiver in the second network.

32. A method of handing over a transceiver from a first network to one of a plurality of candidate networks, the method comprising:
receiving, from a master transceiver of the first network at the transceiver, a communication parameter associated with each of the candidate networks and an indication of a future time instance for possible handover to each of the candidate networks; and
receiving, at the transceiver, a polling message from a master transceiver associated with a particular candidate network at the time instance for possible handover associated with that particular candidate network, wherein the polling message comprises a poll configured to cause a specific poll reply message to the poll; wherein the future time instance indicates the future time as a time offset with respect to an internal clock of the slave transceiver.

33. The method as claimed in claim 32, wherein the polling message contains a channel access code associated with the particular candidate network.

34. The method as claimed in claim 32, further comprising transmitting, from the transceiver, a reply to the polling message, wherein the reply to the polling message includes a channel access code associated with the particular candidate network.

35. The method as claimed in claim 32, wherein each of the networks is a low-power wireless communication network.

36. The method as claimed in claim 32, wherein the receiving, at the transceiver, a polling message from the master transceiver associated with the particular candidate network comprises receiving the polling in a time slot following a time slot allocated to the master transceiver associated with the particular candidate network.

37. The method as claimed in claim 32, wherein the polling message is a null packet.

38. The method as claimed in claim 32, further comprising, in response to receiving the polling message, transmitting a single-packet poll reply message from the transceiver to the master transceiver associated with a particular candidate network.

39. The method as claimed in claim 32, wherein the indication of the future time instance for possible handover to each of the candidate networks comprises a first future time instance for possible handover to a first network of the candidate networks and a second future time instance for possible handover to a second network of the candidate networks.

40. The method as claimed in claim 39, wherein receiving the polling message comprises:
the transceiver listening for a polling message from the first network at the first future time instance; and
the transceiver listening for a polling message from the second network at the second future time instance.

41. A method of handing over a transceiver from a first network to one of a plurality of candidate networks, the method comprising:
receiving from a master transceiver of the first network, by a master transceiver of a particular candidate network, an indication of a future time instance for possible handover to the particular candidate network; and
transmitting a polling message to the transceiver at the time instance for possible handover for the particular candidate network, the transceiver having previously been provided by the master transceiver of the first network with a communication parameter associated with the particular candidate network and with the time instance for possible handover to the particular candidate network, wherein the polling message comprises a poll configured to cause a specific poll reply message to the poll; wherein the future time instance indicates the future time as a time offset with respect to an internal clock of the transceiver.

42. The method according to claim 41, further comprising:
receiving a response from the transceiver that the polling message was received; and
notifying the master transceiver of the first network that the transceiver will be handed over to the particular candidate network.

43. The method as claimed in claim 41, wherein the polling message contains a channel access code associated with the particular candidate network.

44. The method as claimed in claim 41, further comprising receiving a poll reply message from the transceiver.

45. The method as claimed in claim 41, wherein the poll reply message includes a channel access code associated with the particular candidate network.

46. The method as claimed in claim 41, wherein each of the networks is a low-power wireless communication network.

47. The method as claimed in claim 41, wherein the transmitting a polling message to the transceiver comprises transmitting the polling message in a time slot allocated to a master transceiver associated with a particular candidate network.

48. A non-transitory computer-readable medium including instructions stored thereon for handing over a slave transceiver from a first network to a second network, the instructions comprising:
instructions to send an indication of a future time instance for handoff to a slave transceiver;
instructions to send an indication of the time instance to a master transceiver configured to control the second network, to enable the master transceiver to send a poll substantially at the future time instance from the master transceiver to the slave transceiver, wherein the poll comprises a poll configured to cause a specific poll reply message to the poll; and
instructions to send an indication of a network parameter of the second network to the slave transceiver to enable switching the slave transceiver from using a network parameter of the first network to using the network parameter of the second network; wherein the future time instance indicates the future time as a time offset with respect to an internal clock of the slave transceiver.

49. A non-transitory computer-readable medium including instructions stored thereon for handing over a slave transceiver from a first network to a second network, the instructions comprising:
instructions to receive an indication of a time instance for future handover from a first master transceiver of the first network;
instructions to receive an indication of a network parameter of the second network used by the second network from the first master transceiver;
instructions to receive a polling message from the second master transceiver transmitted substantially at the time instance, wherein the polling message comprises a poll configured to cause a specific poll reply message to the poll; and instructions to switch the slave transceiver from using a network parameter of the first network to using the network parameter of the second network; wherein the time instance indicates the time as a time offset with respect to an internal clock of the slave transceiver.

50. A non-transitory computer-readable medium including instructions stored thereon for handing over a transceiver from a first network to one of a plurality of candidate networks, the instructions comprising:

instructions to receive from a transceiver of the first network an indication of a future time instance for possible handover to a particular candidate network; and instructions to transmit a polling message to the transceiver at the time instance for possible handover for the particular candidate network, the transceiver having previously been provided by the master transceiver of the first network with a communication parameter associated with the particular candidate network and with the time instance for possible handover to the particular candidate network, wherein the polling message comprises a poll configured to cause a specific poll reply message to the poll; wherein the future time instance indicates the future time as a time offset with respect to an internal clock of the transceiver.

* * * * *

UNITED STATES PATENT AND TRADEMARK OFFICE
CERTIFICATE OF CORRECTION

PATENT NO. : 8,559,951 B2
APPLICATION NO. : 10/507792
DATED : October 15, 2013
INVENTOR(S) : Chen It is certified that error appears in the above-identified patent and that said Letters Patent is hereby corrected as shown below:

In the Drawings

Fig. 5 should be replaced with the corrected Fig. 5 as shown on the attached page.

Fig. 5, Sheet 3 of 5, delete "  " and insert -- -- , therefor.

In the Specification

Column 3, Line 18, delete "(t2)" and insert -- (T2) --, therefor.

Column 6, Line 42, delete "a opportunity" and insert -- an opportunity --, therefor.

Signed and Sealed this
First Day of July, 2014

Michelle K. Lee
*Deputy Director of the United States Patent and Trademark Office*

FIG. 5

NNL of M1

| Bluetooth Address | Clock Time | Network Address | Master? |
|---|---|---|---|
| B_ADDR (M) | Clk (M2) | AM_ADDR (M1) | Y |
| B_ADDR (M3) | Clk (M3) | AM_ADDR (M2) | Y |
| ⋮ | ⋮ | ⋮ | ⋮ |
| B_ADDR (S) | Clk (S) | AM_ADDR (S) | N |
| B_A | | AM_ADDR (S) | |

Table 1

UNITED STATES PATENT AND TRADEMARK OFFICE
CERTIFICATE OF CORRECTION

| | |
|---|---|
| PATENT NO. | : 8,559,951 B2 |
| APPLICATION NO. | : 10/507792 |
| DATED | : October 15, 2013 |
| INVENTOR(S) | : Chen |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1441 days.

Signed and Sealed this
Thirty-first Day of March, 2015

Michelle K. Lee
*Director of the United States Patent and Trademark Office*